INVENTOR.
RONALD L. DUNN
BY
ATTORNEYS

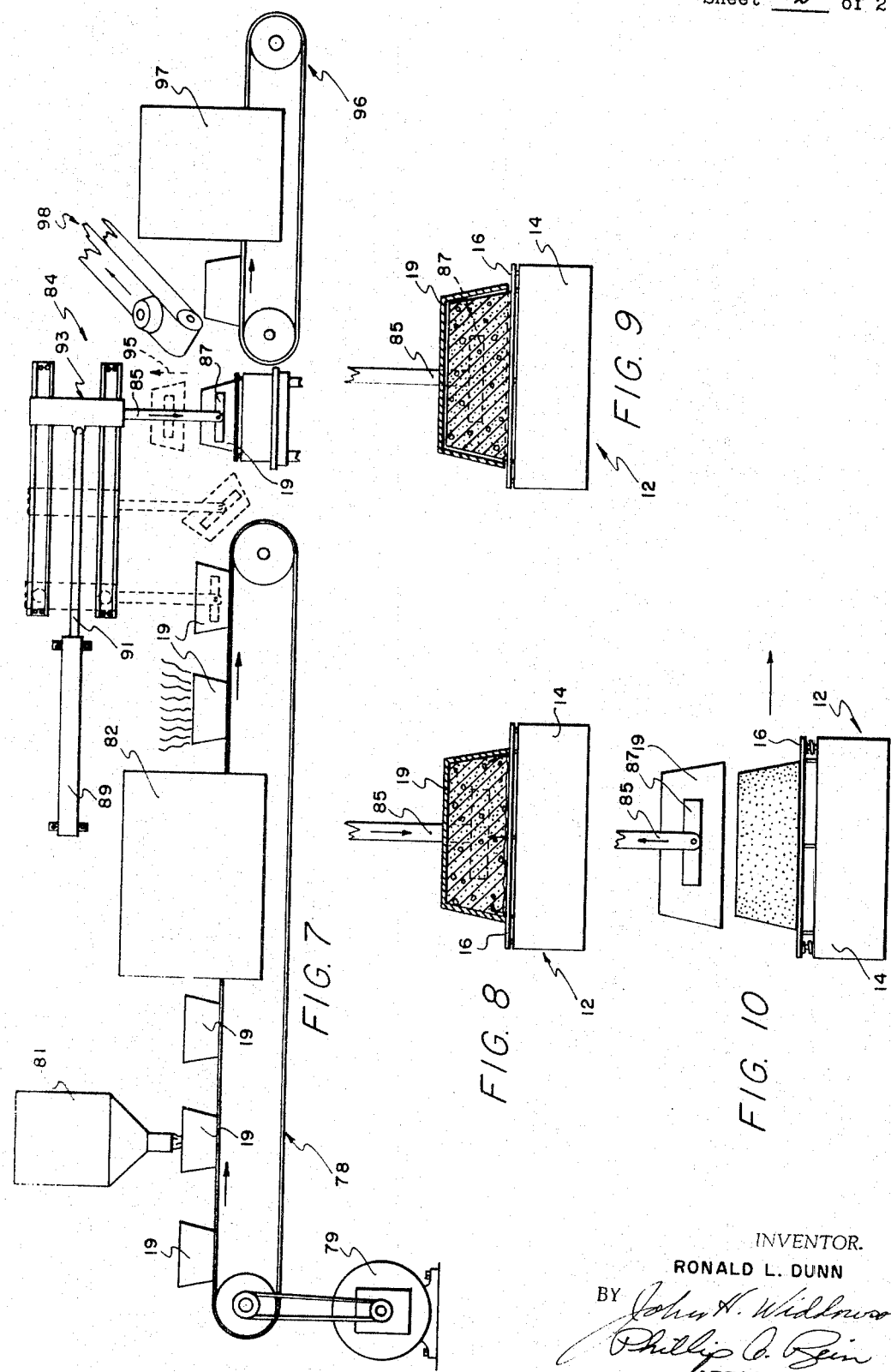

United States Patent Office 3,442,229
Patented May 6, 1969

3,442,229
METHOD AND APPARATUS FOR REMOVING FOODSTUFFS FROM COOKING RECEPTACLES
Ronald L. Dunn, 1333 N. Main,
Wichita, Kans. 67203
Filed Jan. 4, 1967, Ser. No. 607,248
Int. Cl. B29c 7/00
U.S. Cl. 107—54                    10 Claims

ABSTRACT OF THE DISCLOSURE

An apparatus and method of removing baked goods from cooking receptacles through the use of a fluid medium under pressure. The apparatus supplies fluid pressure at a plurality of locations about the periphery of a cooking receptacle. The method of this invention utilizes a conveyor system to fill receptacles; bakes the foodstuffs therein; and separates the receptacles and the baked goods through fluid pressure.

---

Various types of methods and apparatus are known to the prior art operable to remove canned and baked goods from their receptacles. However, the prior art devices require a considerable capital investment, skilled labor to operate and maintain, and specially designed cooking receptacles. Additionally, the prior art methods and apparatus are not reliable in operation, unsatisfactory in high production applications and not adaptable to removing foodstuffs from numerous sizes and shapes of cooking receptacles.

In accordance with the present invention, an apparatus for removing foodstuffs from cooking receptacles is provided which includes a support housing, an actuator plate movably mounted on the support housing, and means for supplying fluid under pressure secured to the support housing and operably connected to the actuator plate. The method of operating the apparatus of this invention involves placing a cooking receptacle on the actuator plate to activate the fluid supply means. The fluid under pressure is directed about the inner periphery of the cooking receptacle to separate the foodstuff therefrom.

In a preferred specific embodiment of the invention, an apparatus is provided to separate foodstuffs from cooking receptacles including a support base having an actuator plate movably mounted thereon. The actuator plate has a pair of spaced, upright guide pins mounted thereon to accurately position a cooking receptacle in a predetermined location. A fluid supply means is secured to the support base having a plurality of elongated discharge arms each having an outlet tip operable to direct fluid under pressure upwardly through openings in the actuator plate. The fluid supply means is provided with a control valve connected between the fluid source and the discharge arms having a lever engageable with the actuator plate to release pressure fluid therethrough. The method of using the apparatus of this invention consists of first inverting a receptacle containing cooked foodstuffs upon the actuator plate in an inverted position and against the guide pins to properly position the inner peripheral edge of the receptacle in alignment with the outlet tips of the discharge arms. The actuator plate supporting the receptacle is moved downwardly against the lever of the control valve to discharge fluid under pressure between the foodstuff and the receptacle thereby separating the same. Finally, the receptacle, foodstuff, and the actuator plate are moved upwardly to stop the fluid discharge with the foodstuff and receptacle being conveyed separate ways for further processing.

Accordingly, it is an object of this invention to provide an apparatus and method for removing foodstuffs from cooking receptacles overcoming the above-metioned disadvantages of the prior art devices.

Another object of this invention is to provide an apparatus for removing foodstuffs from their cooking receptacle using fluid under pressure as a separating means.

A further object of this invention is to provide an apparatus for separating foodstuffs from their receptacles having a support base, an actuator plate movably mounted on the support base, and a fluid supply means engageable with the actuator plate to discharge fluid under pressure about the inner peripheral edge of the receptacle for separating the foodstuff therefrom.

A still further object of this invention is to provide a method for removing foodstuffs from cooking receptacles that is simple to follow, efficient and effective in operation, and requiring a minimum amount of initial capital investment.

One other object of this invention is to provide an apparatus and method for removing foodstuffs from their cooking receptacles that is substantially maintenance free, readily adaptable to high production processing, and easily operable to remove numerous types of foodstuffs from variously shaped cooking receptacles.

Various other objects, advantages, and features of the invention will become apparent to those skilled in the art from the following discussion, taken in conjunction with the accompanying drawings, in which:

FIG. 7 is a schematic elevational view illustrating the various steps of the method of this invention for preparing, conveying, and removing foodstuffs from their cooking receptacles; and FIGS. 8, 9, and 10 are enlarged schematic diagrams illustrating the use and operation of the apparatus of this invention in removing foodstuffs from their cooking receptacles.

Figure 1:
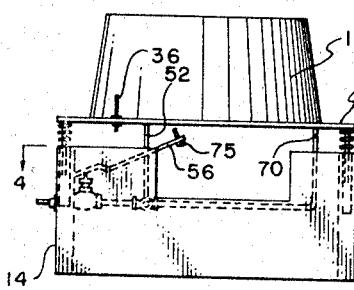
FIG. 1 is an elevational view of the apparatus of this invention illustrated with an inverted cooking receptacle mounted thereon.

The following is a discussion and description of a preferred specific embodiment of the new apparatus and method of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, the apparatus of this invention, indicated generally at 12, includes a support housing or base 14 having an actuator plate assembly 16 mounted thereon and a fluid supply means 18 connected to the support base 14 operably connected to the actuator plate eassembly 16 as will be explained. A cooking receptacle 19 is shown mounted on the actuator plate assembly 16 in an inverted position.

Figure 2:
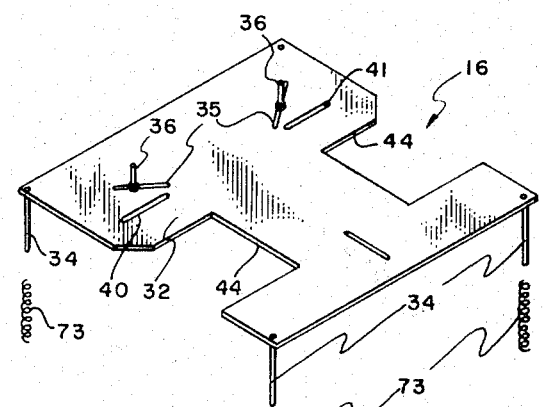
FIG. 2 is an enlarged exploded perspective view of the apparatus of this invention.

More specifically, as shown in FIG. 2, the support base 14 is of a substantially square, open ended box shape having upright sidewalls 21, 22, 24 and 25 with adjoining ends thereof secured to corner posts 27 as by screws, welding, or the like. It is seen that the corner posts 27 provide substantial rigidity to the support base 14 whereupon the lower ends thereof with the bottom edges of the sidewalls 21, 22, 24, and 25 are adapted to be rested on a table or support surface. The upper ends of the corner posts 27 are provided with openings 29 extended downwardly, for example, approximately one-third the axial length of the posts 27. The opposed sidewalls 21 and 22 are provided with U-shaped cut-out sections 31 for reasons to be explained.

Figure 3:
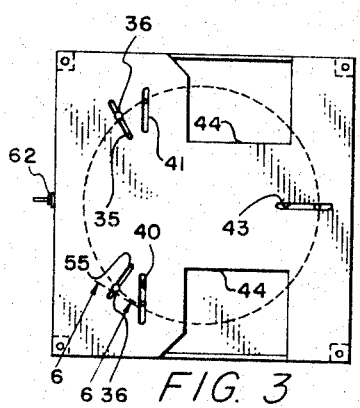
FIG. 3 is a top plan view of the apparatus of this invention.
Figure 4:
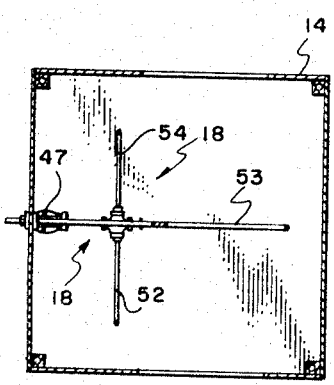
FIG. 4 is a sectional view taken along line 4—4 in FIG. 1.
Figure 6:
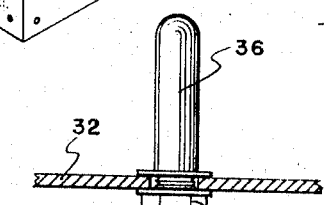
FIG. 6 is an enlarged fragmentary sectional view taken along line 6—6 in FIG. 3.

As shown in FIGS. 2 and 3, the actuator plate assembly 16 includes an actuator plate 32 having downwardly depending guide or alignment legs 34 each positioned so to be mountable within a respective one of the aligned openings 29. It is obvious that the legs 34 can be welded or riveted into the actuator plate 32 as desired. The actuator plate 32 is provided with a pair of spaced guide slots 35 longitudinally directed towards the center portion thereof. Mounted within the respective guide slots 35 are guide pins 36 extended upwardly of the actuator plate 32 movable to a given position and releasably secured thereto as by nut members 38 (FIG. 6). Additionally, the actuator plate 32 is provided with a pair of axially aligned discharge slots 40 and 41 and a third discharge slot 43 extended substantially perpendicular to the first two slots 40 and 41. The function and operation of the discharge slots 40, 41, and 43 will later become obvious. The actuator plate 32 is provided with a pair of opposed hand access cut-outs 44 between the slots 40, 41 and the slot 43. The cut-outs 44 are vertically alignable with the U-shaped cut-outs 31 in the sidewalls 21 and 22.

Figure 5:
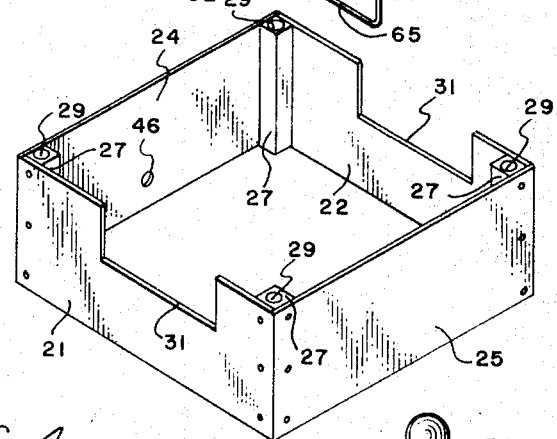
FIG. 5 is an enlarged fragmentary perspective view of a coupling in the fluid supply means of the apparatus of this invention.
Figure 5:
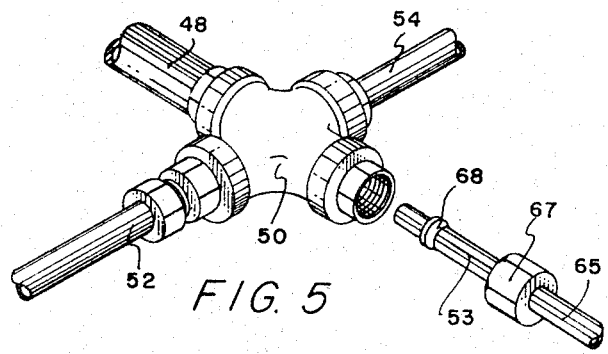

As shown in FIGS. 2 and 5, the fluid supply means 18 is secured to the sidewall 24 of the support base 14 through an opening 46 therein and includes a control valve 47 connected through a conduit 48 and a coupling member 50 to a plurality of laterally extended discharge tubes or arms 52, 53 and 54. The control valve 47 is provided with an actuator lever 56 pivotally connected to a lug member 57 and movable downwardly into engagement with a plunger 59 to control fluid flow therethrough. The control valve 47 is provided with a laterally extended coupling projection 61 mountable through the opening 46 in the sidewall 24 and rigidly secured thereto by a connector clamp member 62 with a washer 64 mounted therebetween. The connector clamp member 62 is adapted to receive a hose (not shown) thereon to supply fluid under pressure from a given source to the control valve 47. The forward end of the control valve 47 is provided with a threaded end adapted to receive the conduit 48 projected forwardly therefrom. In turn, the conduit 48 is connected to the four-way coupling member 50 having the discharge arms 52, 53, and 54 adjustably connected thereto.

The discharge arms 52, 53, and 54 are substantially identical, therefore, only the discharge arm 53 need be described in detail. As shown in FIGS. 2 and 5, the discharge arm 53 is of a tubular construction having a main body 65 having a nut member 67 and a sealing ring member 68 mounted on one end thereof. The nut member 67 is engageable with the coupling member 50 to connect the same thereto and prevent pressure fluid leakage while directing pressure fluid from the control valve 47 through the main body 65. An outer end portion 70 of the main body 65 is bent laterally substantially 90 degrees thereto and the upper outer end thereof is flattened to form an outlet tip 72. It is obvious that the outer end of the portion 70 could be connected to a spray nozzle member if desired to direct fluid therefrom in a controlled direction and pressure. The sealing ring 68 is movable on the main body 65 so that the entire discharge arm 53 is axially movable within the coupling member 50 so as to adjust the distance of the outlet tip 72 from the coupling member 50 for reasons to become obvious.

In the assembly of the apparatus 12 of this invention, the control valve 47 is readily mountable in the opening 46 in the sidewall 24 as previously described whereupon a fluid pressure supply hose (not shown) is attachable to the coupling projection 62 to supply pressure fluid to the control valve 47 with subsequent movement therethrough dependent upon the depression of the actuator lever 56. The alignment legs 34 of the actuator plate are mounted within the openings 29 in the corner posts 27 of the support base 14. A compression spring member 73 is mounted about respective ones of the legs 34 and engageable with the bottom portion of the openings 29 to maintain the actuator plate 32 resiliently spaced a distance above the top edge portions of the support base 14. As shown in FIG. 1, it is seen that in this position the actuator plate 32 is positioned slightly above the outermost end of the actuator lever 56 with the distance therebetween regulated through an adjustment bolt member 75 threaded in the outer end of the actuator lever 56. It is seen, therefore, that downward depression of the actuator plate 32 would contact the adjustment bolt member 75 thereby pivoting the actuator lever 56 about the supporting lug 57 resulting in a downward movement of the plunger 59 and a discharge fluid under pressure through the control valve 47 for discharge through the outlet tips 72.

In the use and operation of the apparatus 12 of this invention, it receives cooking receptacles 19 having baked goods therein from conveyor 78, and such can be placed on apparatus 12 manually or by mechanism 84, as described in detail hereinafter. Empty receptacles 19 are placed on conveyor 78, passed thereby under hopper 81 where they are filled with foodstuffs from the hopper. They are then passed through oven 82 wherein the foodstuffs are baked. Upon leaving oven 82, the cooking receptacle 19 having baked goods therein such as an angel food cake or the like is positioned in an inverted position on the upper surface of the actuator plate 32 with the outer peripheral edge thereof placed into abutting engagement with the upright guide pins 36. With the receptacle 19 in abutting engagement with the guide pins 36, it is obvious that the inner peripheral edge of the receptacle 19 is always maintained in a given path on the actuator plate 32 depending upon the size of the receptacle 19 being used. The discharge arms 52, 53, and 54 are adjustable axially to place the outlet tips 72 in a proper position aligned vertically with the discharge slots 40, 43, and 41, respectively, and positioned between the contacting portions of the baked goods and the receptacle 19. Receptacles 19 are depressed to contact a fluid supply means, and fluid is passed about the periphery of the receptacles thereby separating the baked foodstuff. On downward depression of the receptacle 19 and the contacting actuator plate 32, it is seen that the adjustment bolt 75 is contacted to pivot the actuator lever 56 downwardly to release fluid under pressure through the discharge arms 52, 53, and 54 and the outlet tips 72 to supply the same between the baked goods and the inner peripheral edge of the cooking receptacle 19. This fluid pressure acts to efficiently and effectively release the baked goods adhering to the receptacle 19 so as to be readily removable therefrom, and the separated receptacles are removed. It is obvious that on release of the downward pressure, the receptacle 19, the actuator plate 32, and the lever 56 move upwardly to close the control valve 47 whereupon the baked goods and the receptacle 19 are moved their separate paths for further processing and another food containing receptacle 19 is placed thereon for separation as above described. It is obvious that the guide pins 36 can be readily adjustable within their slots 35 and the discharge arms 52, 53, and 54 can also be readily adjustable whereby the apparatus 12 of this invention is readily usable with various sizes and shapes of cooking receptables. It is also obvious that additional guide pins 36 could be mounted on the actuator plate 32 so that rectangular or square shape cooking receptacles could be mounted thereon for removing the foodstuffs therein by fluid pressure as previously described.

The method of automatically removing foodstuffs from their cooking receptacles is clearly indicated in FIG. 7. As shown therein an elongated conveyor means 78 powered by a motor 79 is operable to carry a plurality of cooking receptacles 19 past a raw material or batter discharge hopper 81 for filling the same with a pre-determined amount. The conveyor means 78 then carries the receptacles 19 filled with the raw material through a baking oven 82 in a conventional manner for a pre-determined time to achieve the desired end result. An invertor mechanism 84 is employed to grasp the receptacles 19 through the use of elongated arm members 85 having transverse rotatable grasping portions 87 to contact the side of the receptacle 19 for elevating and inverting the same. It is obvious that a chain and sprocket drive or an electrical motor and gear box can interconnect the arm members 85 and the grasping portions 87 for controlled relative rotation on upward movement of the arm members 85. The specific details of the inverter mechanism 84 are well known in the material handling art and do not form a part of this invention. The inverter mechanism 84 is shown to be hydraulically actuated as by a cylinder 89 and a push rod 91; however, it is obvious that other types of conventionally available inverter mechanisms can be used. For example, the grasping portions 87 can be of an electrical magnetic type to grasp and hold the receptacle as required.

As shown in dotted lines in FIG. 7 the receptacle 19 is moved into the inverted position and placed downwardly upon the upper surface of the actuator plate 32. A piston and cylinder assembly 93 is thereupon actuated to move the arm members 85 downwardly to depress the receptacle 19 and the actuator plate assembly 16 resulting in a downward movement of the actuator lever 56 to discharge fluid under pressure through the control valve 47. The fluid pressure is discharged through the outlet tips 72 about the inner periphery of the receptacle 19 to separate the foodstuff therein from the receptacle 19. The grasping portions 87 are released from the receptacle 19 and moved upwardly as shown by the arrow 95 in FIG. 7. The foodstuff is moved upon another conveyor means 96 into a packaging unit 97 or the like for further processing; and, simultaneously, the receptacle 19 is moved along a conveyor means 98 into a cleansing area, (not shown).

More specifically, as shown in FIGS. 8, 9 and 10, it is seen that the downward movement of the receptacle 19 and the actuator plate 32 operates to direct fluid under pressure at the exact position where the foodstuff and the inner periphery of the receptacle 19 are contacting and normally adhering whereupon the fluid under pressure acts to separate the same in an efficient and effective manner. The fluid pressure used to remove foodstuffs such as angel food cakes, bread, etc. from their cooking receptacles is normally in the neighborhood of 50 to 60 lbs. per square inch. The fluid pressure is applied for 3 to 6 seconds enabling the same to completely enter into the receptacle 19 to thoroughly and completely separate the foodstuff therefrom.

In the manual operation of the apparatus 12 of this invention, it is seen that the U-shaped cut-outs 31 in the sidewalls 21 and 22 cooperate with the cut-outs 44 in the actuator plate 32 to provide means for grasping the cooking receptacle 19 for applying downward pressure thereon to actuate the control valve 47 without the operator's hands interfering with the sidewalls 21 and 22. It is also seen the cut-outs 31 and 44 are necessary to provide a ready means for removing the separated receptacle 19 and the foodstuff therefrom for further processing.

It is seen that the apparatus and method of this invention presents a simplified structure that is economical to manufacture, simple to use, and requires a minimum amount of initial capital investment. The apparatus is readily adaptable to removing various types of foodstuffs from their cooking receptacles in an efficient and effective manner. The method of this invention provides a simplified process usable with conventional assembly line baking methods having a structure readily insertable therein with a minimum amount of equipment conversion and investment.

As will be apparent from the foregoing descriptions of the preferred embodiments of applicant's apparatus and method, relatively simple and inexpensive means have been provided eliminating a great deal of time consuming and tedious work involved in removing foodstuffs from their receptacles by the use of fluid pressure without damage to the receptacles or foodstuffs.

While the invention has been described in conjunction with preferred specific embodiments thereof, it will be understood that this description is intended to illustrate and not to limit the scope of the invention, which is defined by the following claims.

I claim:
1. An apparatus for removing foodstuff and the like from their receptacles, comprising:
   (a) a support housing,
   (b) fluid supply means secured to said housing, having a discharge outlet selectively operable to discharge a fluid under pressure therefrom, and
   (c) an actuator plate mountable on said housing selectively engageable with said fluid supply means to release fluid from said outlet, said actuator plate adapted to receive one of the receptacles and discharge fluid from said outlet between the sidewalls of the receptacles and the foodstuff therein to release the same.
2. An apparatus as described in claim 1, including:
   (a) guide pins connected to said actuator plate to position the receptacle properly thereon whereby depression of said actuator plate releases the fluid under pressure between the foodstuff and the receptacle to separate the foodstuff therefrom.
3. An apparatus as described in claim 1 wherein:
   (a) said actuator plate has spaced slots therein to permit the fluid under pressure to pass therethrough, and
   (b) said slots are positioned transversely of the periphery of the receptacle to properly discharge the fluid between the foodstuff and the receptacle.
4. An apparatus as described in claim 1, wherein:
   (a) said actuator plate has support legs mounted within openings in said support housing and is biased upwardly by spring members, and
   (b) said fluid supply means having a lever member engageable with said actuator plate on depression thereof to discharge the fluid under pressure whereby release of said actuator plate ceases supply of pressure fluid.
5. An apparatus as described in claim 1, wherein:
   (a) said fluid supply means has a control valve, an actuator lever connected to said control valve, and a plurality of laterally extended discharge arms operable to convey fluid therethrough.
   (b) said discharge arms having outer tip members positioned to discharge fluid between the receptacle and the foodstuff, and
   (c) said actuator plate selectively engageable with said lever to release the fluid under pressure and separate the foodstuff from the receptacle.
6. An apparatus as described in claim 1, wherein:
   (a) said actuator plate has a plurality of slots operable to permit air flow therethrough and guide pins adjustably mounted thereon operable to maintain the fluid under pressure through said slots aligned with the inner periphery of the receptacle to release the foodstuffs therefrom.
7. An apparatus as described in claim 1, wherein:
   (a) said support housing has a plurality of sidewalls interconnected by corner posts,
   (b) said actuator plate having a plurality of downwardly depending support legs mounted on respective ones of said corner posts and spring members mounted about respective ones of said legs to resiliently maintain said actuator plate in an upper inactive position, and (c) said fluid supply means having a lever engageable with said actuator plate when in the depressed position to release fluid under pressure therefrom, and said fluid supply means having a plurality of discharge arms with outlet tips to direct fluid under pressure about the periphery of a receptacle mounted on said actuator plate to release the foodstuff therefrom.

8. A method of removing foodstuffs from a cooking receptacle comprising the following steps:
(a) conveying a plurality of cooking receptacles on a conveyor means,
(b) filling each of said receptacles with foodstuff,
(c) cooking said receptacles containing the foodstuff within an oven,
(d) placing said receptacles onto an actuator plate mounted on the support base of a separating apparatus,
(e) depressing said receptacles to contact a fluid supply means mounted within said support base to release fluid under pressure about the periphery of the receptacle thereby separating the cooked foodstuff therefrom, and
(f) removing the separated receptacles.

9. A method as described in claim 8, wherein:
(a) said fluid supply means has a plurality of spaced discharge arms with outlet tips positioned about the inner periphery of said receptacle, and
(b) on depression of said receptacle on said actuator plate, fluid under pressure is discharged through said outlet tips to separate the foodstuffs from said receptacles by fluid action.

10. A method as described in claim 8, wherein:
(a) said fluid supply means operable to discharge fluid at 55 p.s.i. adjacent the open, inner peripheral edge of said receptacles to separate the foodstuffs therefrom.

References Cited
UNITED STATES PATENTS

| 2,271,937 | 2/1942 | Engels | 214—310 |
| 2,962,984 | 12/1960 | Noel | 107—57 |
| 3,272,361 | 9/1966 | Vogel et al. | 107—57 |
| 3,288,088 | 11/1966 | Leedy | 214—309 X |

WALTER A. SCHEEL, *Primary Examiner.*

JOSEPH SHEA, *Assistant Examiner.*

U.S. Cl. X.R.

214—310